(12) United States Patent
Zhong

(10) Patent No.: US 10,563,729 B2
(45) Date of Patent: Feb. 18, 2020

(54) HYPER-CYCLOIDAL DIFFERENTIAL

(71) Applicant: SCHAEFFLER TECHNOLOGIES AG & CO. KG, Herzogenaurach (DE)

(72) Inventor: Guihui Zhong, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 229 days.

(21) Appl. No.: 15/864,492

(22) Filed: Jan. 8, 2018

(65) Prior Publication Data
US 2019/0211904 A1    Jul. 11, 2019

(51) Int. Cl.
*F16H 48/06* (2006.01)
*F16H 1/32* (2006.01)

(52) U.S. Cl.
CPC ............... *F16H 1/32* (2013.01); *F16H 48/06* (2013.01)

(58) Field of Classification Search
CPC .. F16H 1/32; F16H 48/06; B60K 1/00; B60K 7/007; B60K 17/16
See application file for complete search history.

(56) References Cited

U.S. PATENT DOCUMENTS

| 3,499,348 | A |   | 3/1970  | Hartupee |          |
|-----------|---|---|---------|----------|----------|
| 3,791,237 | A |   | 2/1974  | Kitano et al. | |
| 5,123,884 | A | * | 6/1992  | Kondoh ...................... F16H 1/32 |
|           |   |   |         |          | 464/89   |
| 5,197,930 | A |   | 3/1993  | Imase    |          |
| 5,290,208 | A | * | 3/1994  | Minegishi ................. F16H 1/32 |
|           |   |   |         |          | 475/176  |
| 7,147,582 | B2 |  | 12/2006 | Mingishi et al. | |
| 7,407,373 | B2 | * | 8/2008 | Ogata ..................... F04C 2/084 |
|           |   |   |         |          | 418/171  |
| 7,749,123 | B2 |  | 7/2010 | Miao et al. | |
| 8,221,278 | B2 |  | 7/2012 | Biermann et al. | |
| 9,005,065 | B2 | * | 4/2015 | Huang ...................... F16H 1/32 |
|           |   |   |         |          | 475/168  |
| 9,752,665 | B2 | * | 9/2017 | Yang ...................... H02K 7/116 |
| 9,914,349 | B2 | * | 3/2018 | Kuroda .................. B60K 17/14 |
| 10,184,547 | B2 |  | 1/2019 | Fecko   |          |
| 10,359,098 | B1 | * | 7/2019 | Zhong ..................... F16H 1/32 |
| 10,359,099 | B1 | * | 7/2019 | Gardner ................... F16H 1/32 |
| 10,378,613 | B1 | * | 8/2019 | Lee ......................... F16H 48/06 |

(Continued)

FOREIGN PATENT DOCUMENTS

JP    2016031081 A    3/2016

OTHER PUBLICATIONS

International Search Report and Written Opinion for Application No. PCT/US2018/061967, dated Mar. 12, 2019, 11 pages.

(Continued)

*Primary Examiner* — Patrick H Mackey
(74) *Attorney, Agent, or Firm* — Brooks Kushman, P.C.

(57) ABSTRACT

A cycloidal differential includes a driven body and a first cycloidal drive having a first input member rotationally fixed to the body and a first output member configured to connect with a first half shaft. The differential further includes a second cycloidal drive having a second input member rotationally fixed to the body and a second output member configured to connect with a second half shaft. An eccentric shaft, of the differential, extends through the driven body and is connected between the first and second cycloidal drives.

20 Claims, 3 Drawing Sheets

(56) References Cited

U.S. PATENT DOCUMENTS

| | | |
|---|---|---|
| 2006/0089227 A1 | 4/2006 | Fanselow et al. |
| 2008/0188341 A1 | 8/2008 | Miao et al. |
| 2011/0082000 A1* | 4/2011 | Makino .................... B60K 1/00 475/149 |
| 2012/0329597 A1* | 12/2012 | Nomura .................... F16H 1/32 475/150 |
| 2013/0143707 A1* | 6/2013 | Suzuki ...................... F16H 1/32 475/149 |
| 2013/0178322 A1* | 7/2013 | Takuno .................... F16H 1/32 475/178 |
| 2013/0257202 A1* | 10/2013 | Takuno ................. H02K 7/116 310/83 |
| 2013/0260941 A1* | 10/2013 | Nomura ................. F16H 37/08 475/150 |
| 2014/0018202 A1* | 1/2014 | Nomura .................... F16H 1/32 475/149 |
| 2014/0018203 A1 | 1/2014 | Huang et al. |
| 2015/0099600 A1* | 4/2015 | Nilsson .................. B60L 50/16 475/150 |
| 2017/0152931 A1 | 6/2017 | Noguchi et al. |

OTHER PUBLICATIONS

Notice of Allowance for U.S. Appl. No. 15/864,460 dated Apr. 3, 2019, 13 pages.
Notice of Allowance for U.S. Appl. No. 15/864,442 dated Apr. 3, 2019, 13 pages.

* cited by examiner

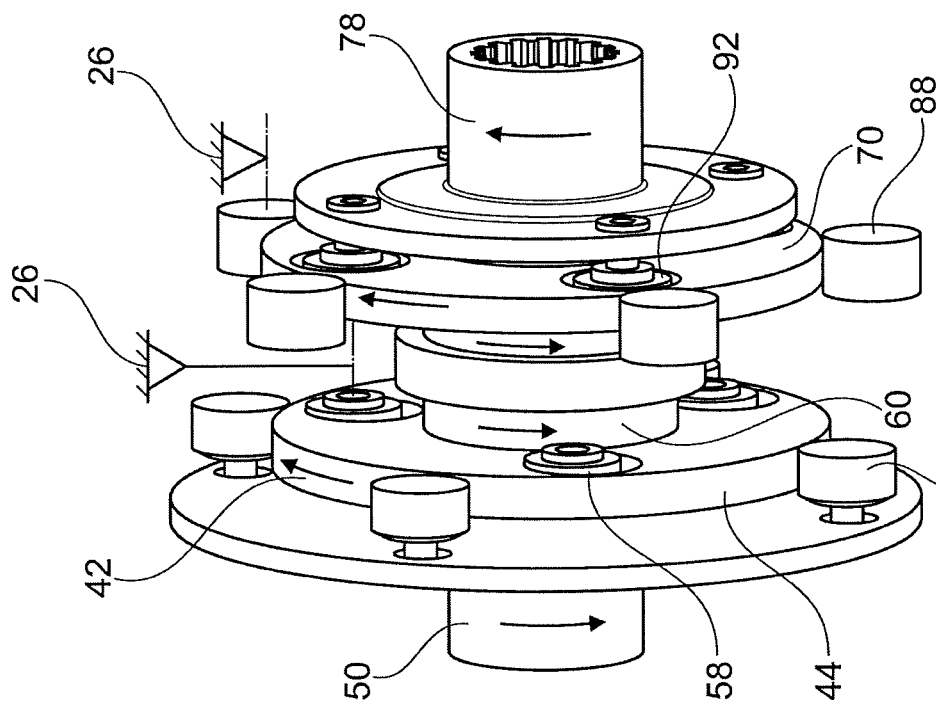
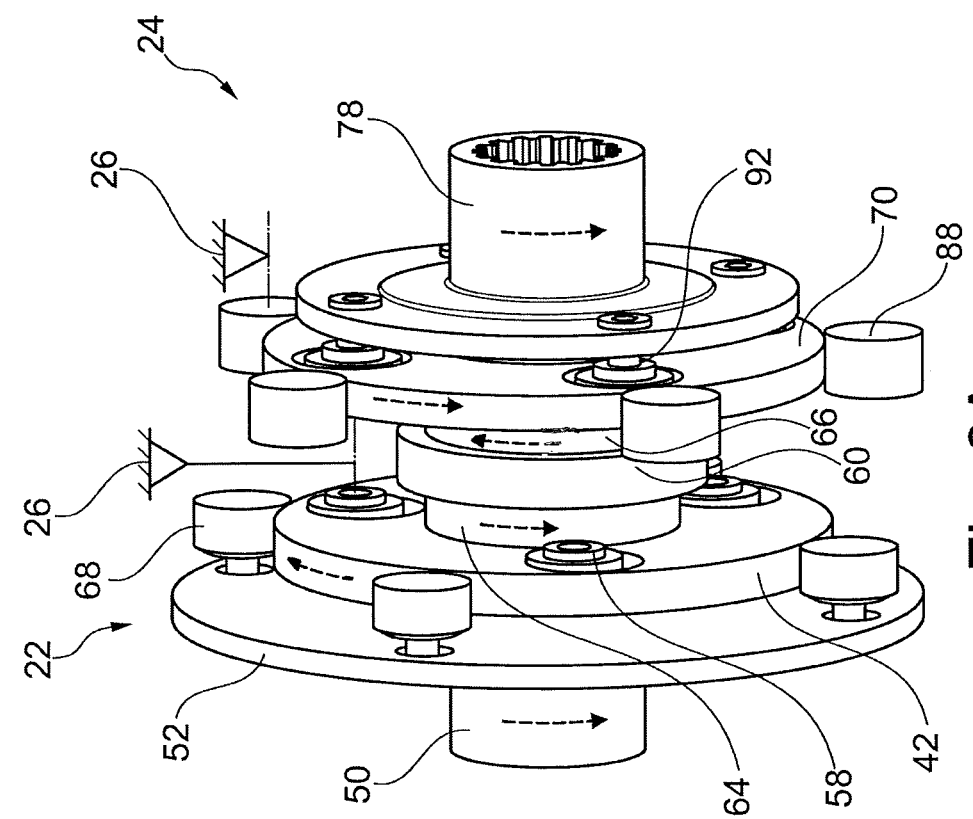
Fig. 3B
Fig. 3A

HYPER-CYCLOIDAL DIFFERENTIAL

TECHNICAL FIELD

The present disclosure relates to differentials for vehicles and more specifically to cycloidal differentials that include a pair of cycloidal drives arranged to allow independent rotation of the left and right wheels.

BACKGROUND

Cycloidal drives are commonly used as speed-reducer mechanisms. A typical cycloidal drive includes an input shaft having an eccentric end connected to a cycloidal disk (also known as a cycloidal cam). The disk includes a plurality of lobes that intermesh with ring pins circumferentially surrounding the disk. The ring pins are typically stationary with the housing of the speed reducer. An output shaft includes an array of circumferentially arranged rollers that are received within holes defined in the cycloidal disk. The input shaft drives the disk in an eccentric, cycloidal motion. Motion is transferred from the disk to the output shaft via the plurality of rollers. The eccentric, cycloidal motion of the disk reduces the speed between the input shaft and the output shaft according to the number of lobes, holes, pins, and rollers. The difference between the number of rollers and the number of lobes is usually one, and the number of lobes usually matches the number of pins.

SUMMARY

According to one embodiment, a cycloidal differential includes a driven body and a first cycloidal drive having a first input member rotationally fixed to the body and a first output member configured to connect with a first half shaft. The differential further includes a second cycloidal drive having a second input member rotationally fixed to the body and a second output member configured to connect with a second half shaft. An eccentric shaft, of the differential, extends through the driven body and is connected between the first and second cycloidal drives.

According to another embodiment, a cycloidal differential includes a driven body and an eccentric shaft having a first eccentric disk and a second eccentric disk. A first cycloidal cam is operably coupled to the driven body and is received on the first disk. A second cycloidal cam is operably coupled to the driven body and is received on the second disk.

According to yet another embodiment, a cycloidal differential includes a driven body, a first cycloidal drive, and a second cycloidal drive. The first cycloidal drive is operably coupled to the driven body and includes a first cycloidal cam defining lobes, and holes that are circumferentially arranged. First pins are circumferentially arranged and rotationally fixed to the driven body. Each of the pins is disposed in one of the holes. A first output member is configured to connect with a first half shaft. First rollers are attached to the output member in a circumferential arrangement and are engaging with the lobes. The second cycloidal drive is operably coupled to the driven body and includes a second cycloidal cam defining lobes, and holes that are circumferentially arranged. Second rollers are attached to the driven body in a circumferential arrangement and are engaging with the lobes of the second cam. A second output member is configured to connect with a second half shaft. Second pins are circumferentially arranged and are rotationally fixed to the second output member. Each of the second pins is disposed in one of the holes of the second cam. The differential further includes a coupling member connected between the first and second cams.

BRIEF DESCRIPTION OF THE DRAWINGS

FIG. 3A is a diagrammatical view of the cycloidal differential showing component rotation during straight-line driving.

FIG. 3B is a diagrammatical view of the cycloidal differential showing component rotation during cornering.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles may include a differential on a driven axle to multiply torque of the powertrain and/or allow independent rotation of the left and right driven wheels during cornering. Differentials include a housing supported under the vehicle and have left and right connections configured to receive left and right half shafts of the driven axle. The half shafts transmit torque from the differential to the driven wheels. Used herein "half shaft" refers to any shaft that transmits power from a differential to a driven wheel.

Many types of differentials are known including bevel-gear differentials and spur-gear differentials. These differentials include a gear train disposed within the differential case in order to transmit power from the driveshaft to the half shafts. These types of differentials tend to be bulky requiring a sizable packaging space. The following figures and related text describe a completely different type of differential that does not include a gear train and instead includes a pair of cycloidal drives coupled in tandem. This type of differential is referred to herein as a "cycloidal differential." Cycloidal differentials are compact and require less packaging space on the vehicle than traditional differentials.

Figure 1:
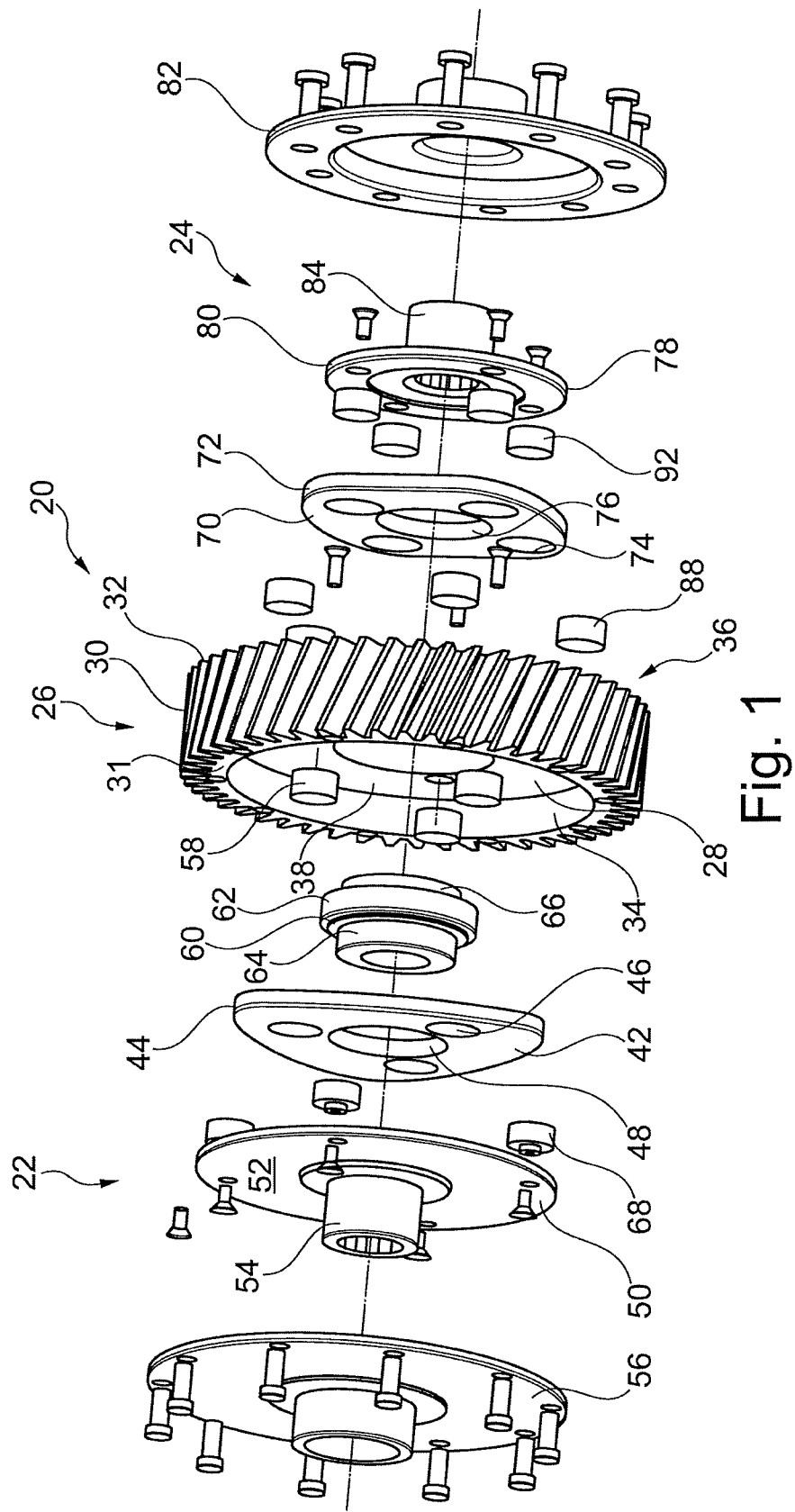
FIG. 1 is an exploded perspective view of a cycloidal differential.
Figure 2:
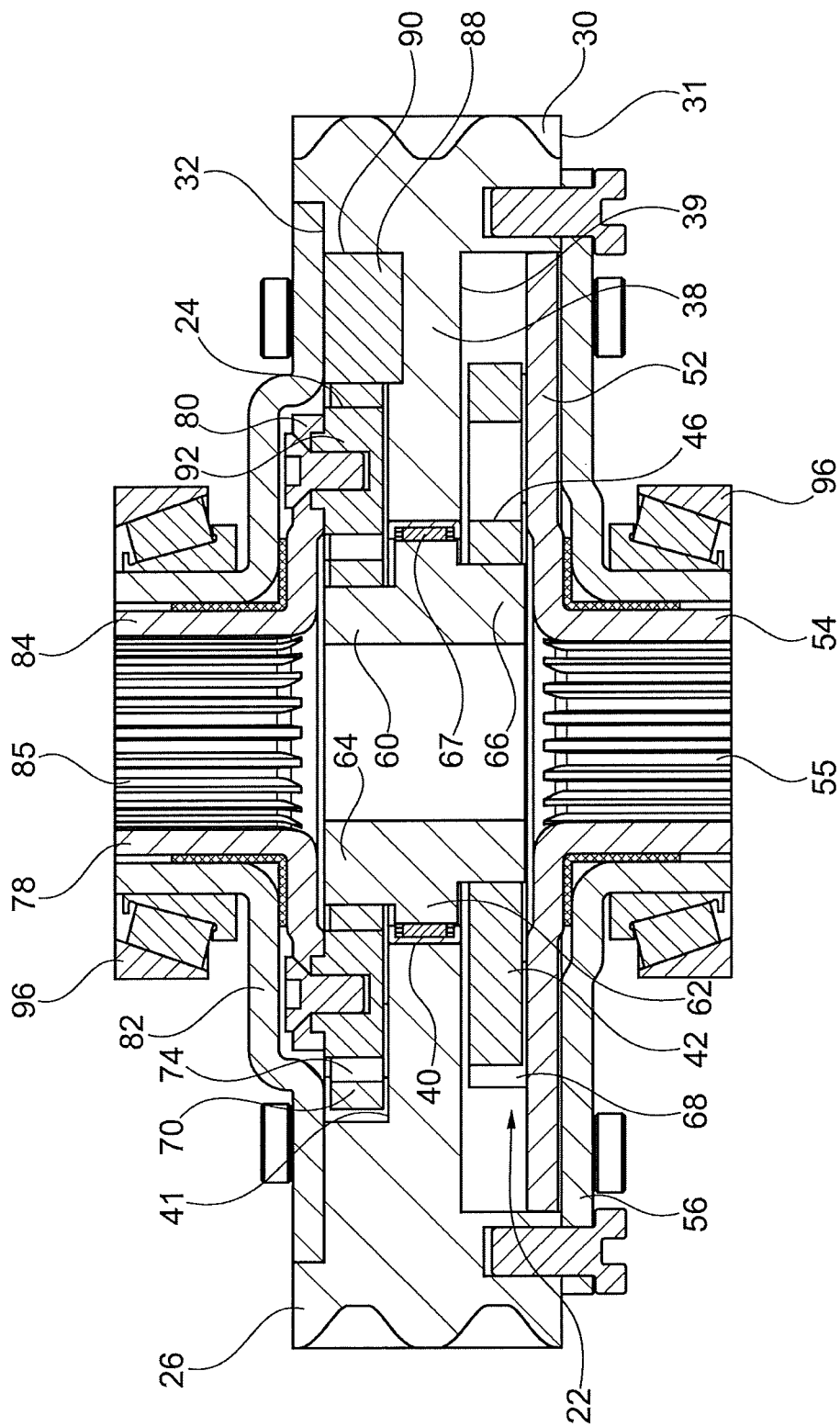
FIG. 2 is a cross-sectional perspective view of the cycloidal differential.

Referring to FIGS. 1 and 2, a cycloidal differential 20 includes a driven body that is the power-receiving element of the differential. The driven body may be operably coupled to a driveshaft. The driven body may be a gear such as ring gear 26. Alternatively, the driven body may be a bevel gear, a chain-driven sprocket, a belt-driven pulley, or the like. In the illustrated embodiment, the differential 20 includes a first cycloidal drive 22 and a second cycloidal drive 24 disposed on opposing sides of a ring gear 26. The ring gear 26 includes a hub 28 and gear teeth 30. The gear teeth 30 may mesh with gear teeth of a pinion driven by the driveshaft. The hub 28 includes a first end face 31 and a second end face 32 disposed on opposite sides of the hub 28. The hub 28 may define a first recess portion 34 and a second recess portion 36 that are separated by an intermediate wall 38.

The first cycloidal drive 22 is at least partially disposed in the first recess portion 34, and the second cycloidal drive 24 is at least partially disposed in the second recessed portion 36. The intermediate wall 38 defines a central bore 40 allowing components to extend through the ring gear 26 and connect between the first and second drives 22, 24.

Each of the cycloidal drives 22, 24 have an output member configured to connect with one of the half shafts to supply power from the differential 20 to the driven wheels. The differential 20 includes a coupling element that interconnects the first and second cycloidal drives 22, 24. The differential 20 is configured so that the output members, the coupling element, and the ring gear 26 rotate at the same speed when the vehicle is traveling in a straight line. During a turn, the outside output member rotates faster than the ring gear 26 and the inside output member rotates slower than the ring gear, and the coupling element rotates faster than both of the output members making the differential 20 a hyper-cycloidal differential.

The coupling member may be an eccentric shaft 60 having a circular portion 62 that is supported within the hub 28 of the ring gear 26. For example, a bearing 67 may be interposed between the circular portion 62 and the central bore 40 to support the eccentric shaft 64 for rotation within the hub 28. The eccentric shaft 60 may also have opposing eccentric disks 64 and 66 disposed on opposite ends of the shaft. The first cycloidal drive 22 may be connected to the first disk 64, and the second cycloidal drive 24 may be connected to the second disk 66. The first and second disks 64, 66 may have different center points to create a phase difference. The phase difference between the first and second disks may be between 170 and 200 degrees, inclusive. In the illustrated embodiment, the phase difference is 180 degrees. A phase difference between the disks may not be required in all applications.

The first cycloidal drive 22 includes a cycloidal cam 42 having lobes 44 forming the circumferential perimeter of the cam and circular holes 46 circumferentially arranged and extending through the cam 42. The number of lobes 44 and the number of holes 46 may be equal. In the illustrated embodiment, the cam 42 has three lobes and three holes. The cycloidal cam 42 defines a bore 48 that is seated on the first eccentric disc 64. A bearing may be interposed between the disk 64 and the bore 48.

An output member 50 of the first drive 22 may include a flange portion 52 and a shaft portion 54. The shaft portion 54 may define internal splines 55 configured to connect with one of the half shafts. The cam 42 is connected to the output member 50 via a plurality of rollers 68. The rollers 68 are circumferentially arranged on the flange portion 52 such that the rollers 68 engage with the lobes 44 of the cam 42. The rollers 68 may be attached to the flange portion 52 with fasteners. A bearing may be disposed between the fasteners and the rollers 68 to reduce friction. In one embodiment, the rollers 68 are needle bearings.

Pins 58 of the first drive 22 may be attached to a first side 39 of the intermediate wall 38 by fasteners or the like. The pins 58 are circumferentially arranged on the first side 39 so that the pins 58 are received within the holes 46 of the cam 42. The diameter of the pins 58 is less than the diameter of the holes 46 to facilitate the eccentric, cycloidal motion of the cam 42 (also known as orbital or wobbling motion). Collectively, the pins 58 revolve with the ring gear 26 and thus are the input members of the first cycloidal drive 22. Each of the pins 58 may rotate about its axis. The drive 22 may include one more roller 68 than pins 58. In the illustrated embodiment, the drive 22 includes three pins 58 and four rollers 68.

The first drive 22 includes an endplate 56 that is attached to the first end face 31 of the hub 28. The endplate 56 includes a flange portion that covers the cycloidal drive 22 and a central portion that receives the shaft portion 54 of the output member 50. The endplate 56 may be attached to the end face 31 by fasteners.

Similar to a planetary gear set, if one of the pins 58, output member 50, and eccentric shaft 60 is held static, then the other two components will rotate relative to each other at different speeds. For example, if the output member 50 is held static, the eccentric shaft 60 and the ring gear 26 will rotate in opposite directions and at different speeds. In the illustrated embodiment, the ring gear 26 will rotate four times slower than the eccentric shaft 60.

The second cycloidal drive 24 includes a cycloidal cam 70 having lobes 72, circular holes 74, and a bore 76. The cycloidal cam 70 is supported by the eccentric shaft 60 with the bore 76 seated on the second eccentric disc 66. A bearing may be interposed between the disk 66 and the bore 76. In the illustrated embodiment, the cam 70 includes four lobes 72 and four holes 74.

The second cycloidal drive 24 also includes a plurality of rollers 88 that are attached to the hub 28. The rollers 88 may be fastened to a second side 41 of the intermediate wall 38 by fasteners. In one embodiment, the rollers 88 are needle bearings. The hub 28 may define pockets 90 for receiving the rollers 88. The rollers 88 are circumferentially arranged on the hub 28 to receive the cam 70, which is disposed within the second recess portion 36. The second drive 24 is configured such that the rollers 88 engage with the lobes 72 allowing the eccentric, cycloidal motion of the cam 70. The number of rollers 88 may be one more than the number of lobes 72. In the illustrated embodiment, the drive 24 includes four lobes 72 and five rollers 88. The rollers 88 are attached to the ring gear 26 and are the input member of the second drive 24.

Pins 92 of the second drive 24 may be attached to an output member 78. The output member 78 may include a flange portion 80 and a shaft portion 84. The shaft portion 84 may define internal splines 85 configured to connect with one of the half shafts. The pins 92 are circumferentially arranged on the flange portion 80 so that the pins 92 are received within the holes 74 of the second cycloidal cam 70. A diameter of the pins 92 is smaller than the diameter of the holes 74 to facilitate the eccentric, cycloidal motion of the cam 70. The number of pins 92 may be one less than the number of rollers 88. In the illustrated embodiment, the second drive 24 includes four pins and five rollers.

The output member 78 is supported by an endplate 82 that is attached to the second end face 32 of the hub 28. The endplate 82 includes a flange portion that covers the cycloidal drive 24 and a central portion that receives the shaft portion 84 of the output member 78.

Similar to first drive 22, if one of the ring gear 26, output member 78, and eccentric shaft 60 is held static, then the other two components will rotate relative to each other at different speeds. For example, if the ring gear 26 is held static, the eccentric shaft 60 and the output member 78 will rotate in opposite directions and at different speeds. In the illustrated embodiment, the output member 78 will rotate four times slower than the eccentric shaft 60.

In the illustrated embodiment, the first cycloidal drive 22 is a third-order drive (cam 42 has three lobes) and the second cycloidal drive 24 is a fourth-order drive (cam 70 has four lobes). By having one of the drives of m order and the other of m+1 order, the speed ratios between the output members are equal. While illustrated as having a third-order drive and a fourth-order drive, the differential 20 may have any combination of an m order drive and an m+1 order, where m is greater than or equal to 2.

The cycloidal drives allow for a very compact differential. The entire assembly with the exception of the output members may be completely disposed between the endplates 56, 82 and within the hub 28 of the ring gear 26. In a traditional bevel-gear differential, a carrier is attached to the bevel gear and axially extends significantly past a footprint of the bevel gear. This enlarges the differential housing and requires vehicle designers to provide a much larger packaging space for the bevel-gear differential. In contrast, the differential 20 is supported in the case by a pair of bearings 96. The bearings 96 are in close proximity to the ring gear 26. The differential case (not shown) need not extend past the bearings 96. Thus, a much smaller packaging space is required for the differential 20 as compared to traditional differentials.

In FIG. 3A the dashed arrows indicate would-be relative rotation between the illustrated parts—not actual relative rotation. (As will be explained below, the entire assembly is locked relative to each other and rotates in unison with the ring gear 26.) The differential 20 is shown with the output members 50 and 78 rotating at the same speed (in the clockwise direction) such as during straight-line driving of the vehicle. The ring gear 26 (not shown) rotates at the same speed as the output members when the output members rotate at the same speed. During straight-line driving, and the first drive 22 urges the first disk 64 to rotate in the clockwise direction, and the second drive 24 urges the second disc 66 to rotate in the counterclockwise direction. Since the first and second disks are fixed to the same shaft, rotation in the opposite direction is not possible. Thus, the eccentric shaft 60 locks the first and second drives 22, 24 relative to each other causing the output member 50 and the output member 78 to rotate in the same direction, which is in unison with the ring gear 26. The eccentric shaft 60 locks the output members 50, 78 due to an equal number of rollers 68 and pins 92.

Assuming that the ring gear 26 is held static and the first and second output members 50 and 78 receive an equal amount of torque in the clockwise direction, torque of the output member 50 urges the rollers 68 to revolve around a centerline of the differential 20. This urges the cam 42 to have a counterclockwise eccentric, cycloidal motion. The cam 42 urges the first eccentric disc 64 to rotate in the clockwise direction.

In the second drive 24, the clockwise torque of the output member 78 urges the pins 92 to revolve in the clockwise direction around the centerline. The pins 92 urge the cam 72 rotate in the clockwise direction, which urges the second disc 66 to rotate in the counterclockwise direction. Thus, the first and second disc 64, 66 are urged in opposite directions. The shaft 60 prevents this causing the differential 20 to lock up, i.e., none of the individual components of the differential rotate relative to each other. Instead, all of the individual components rotate/revolve with the ring gear 26. Thus, when the vehicle is driving in a straight line, the output members 50, 78, the shaft 60, and the ring gear 26 rotate at the same speed and in the same direction.

In FIG. 3B the solid arrows indicate actual relative rotation between the illustrated parts—not overall rotation. (The entire illustrated assembly rotates clockwise with the ring gear.) The differential 20 is shown during cornering of the vehicle with the output members 50 and 78 rotating at the different speeds. The output member 78 is connected to the inner wheel, and the output member 50 is connected to the outer wheel.

Normally, rotation is transferred from the ring gear 26 into the pins 58 of the first drive 22 and into the rollers 88 of the second drive 24 causing the output member 50 and 78 to rotate. During a corner, however, the output member 50 is rotating faster than the ring gear 26 and is inputting rotation into the differential 20. The clockwise rotation of the output member 50, i.e., increased angular speed, causes counterclockwise eccentric, cycloidal motion of the cam 42 due to rolling engagement between the rollers 68 and the lobes 44. The counterclockwise eccentric, cycloidal motion of the cam 42 causes the eccentric shaft 60 to rotate clockwise. The first drive 22 is arranged such that a speed multiplication occurs between the output member 50 and the eccentric shaft 60. In the illustrated embodiment, the eccentric shaft 60 rotates four times faster than the output member 50.

Rotation of the eccentric shaft 60 in the clockwise direction causes counterclockwise eccentric, cycloidal motion of the cam 70. The cam 70 causes the pins 92 to revolve in the counterclockwise direction about the centerline of the differential, which in turn, causes the output shaft 78 to rotate in the counterclockwise direction. The output member 78 rotates four times slower than the eccentric shaft 60 in the illustrated embodiment. The counterclockwise direction of the output member 78 is being used as a relative term meaning that the output member 78 is rotating slower than the ring gear 26 and the output member 50. In reality, both of the output members 50 and 78 rotate in the same direction, which is also the same direction of rotation as the ring gear, but at different speeds.

This disclosure is not limited to the illustrated embodiments. The cycloidal drives of the differential can be rearranged to form other types of cycloidal differentials. Applicant's co-pending applications—U.S. patent application Ser. No. 15/864,442 and U.S. patent application Ser. No. 15/864,460, filed on the same day as this disclosure, which are incorporated in their entirety by reference herein—disclose other types of cycloidal differentials.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

What is claimed is:

1. A cycloidal differential comprising:
   a driven body;
   a first cycloidal drive including a first input member rotationally fixed to the body and a first output member configured to connect with a first half shaft;
   a second cycloidal drive including a second input member rotationally fixed to the body and a second output member configured to connect with a second half shaft; and an eccentric shaft extending through the driven body and connected between the first and second cycloidal drives.

2. The cycloidal differential of claim 1, wherein the eccentric shaft includes a first eccentric disk connected to the first drive and a second eccentric disk connected to the second drive.

3. The cycloidal differential of claim 2, wherein the first and second disks have different center points.

4. The cycloidal differential of claim 3, wherein a phase difference between the first and second disks is between 170 and 200 degrees, inclusive.

5. The cycloidal differential of claim 2, wherein the first cycloidal drive includes a cycloidal cam defining a circular opening that receives the first eccentric disk.

6. The cycloidal differential of claim 5, wherein the cam defines a hole and the input member is disposed in the hole.

7. The cycloidal differential of claim 5, wherein the second cycloidal drive includes a second cycloidal cam defining a circular opening that receives the second eccentric disk.

8. The cycloidal differential of claim 7, wherein the second cam has lobes that engage with the second input member.

9. The cycloidal differential of claim 8, wherein the second input member is a plurality of rollers circumferentially arranged around a periphery of the second cam.

10. The cycloidal differential of claim 8, wherein the second output member is connected to the second cam by pins received in holes defined by the second cam.

11. The cycloidal differential of claim 2, wherein the first drive includes a first cam mounted on the first disk and defining m number of lobes, and the second drive includes a second cam mounted on the second disk and defining m+1 number of lobes.

12. The cycloidal differential of claim 1, wherein the body is a gear defining a first recess that receives the first drive and a second recess that receives the second drive, wherein the gear defines a central opening and the eccentric shaft extends therethough.

13. A cycloidal differential comprising:
a driven body;
an eccentric shaft including a first eccentric disk and a second eccentric disk;
a first cycloidal cam operably coupled to the driven body and received on the first disk; and
a second cycloidal cam operably coupled to the driven body and received on the second disk.

14. The cycloidal differential of claim 13, wherein the first and second eccentric disks have different center points.

15. The cycloidal differential of claim 13, wherein the first disk defines m number of lobes, and the second cam defines m+1 number of lobes.

16. The cycloidal differential of claim 13 further comprising an input member rotationally fixed to the driven body, and wherein the first cam defines a hole that receives the input member therein.

17. The cycloidal differential of claim 13, wherein first cam defines a circumferential arrangement of holes, and further comprising pins circumferentially arranged on the driven body and received in the holes.

18. The cycloidal differential of claim 13, wherein the first cam is operably coupled to a first output member, and the second cam is operably coupled to a second output member.

19. A cycloidal differential comprising:
a driven body;
a first cycloidal drive operably coupled to the driven body and including:
a first cycloidal cam defining lobes, and holes that are circumferentially arranged,
first pins circumferentially arranged and rotationally fixed to the driven body, wherein each of the pins is disposed in one of the holes,
a first output member configured to connect with a first half shaft, and
first rollers attached to the output member in a circumferential arrangement and engaging with the lobes;
a second cycloidal drive operably coupled to the driven body and including:
a second cycloidal cam defining lobes, and holes that are circumferentially arranged,
second rollers attached to the driven body in a circumferential arrangement and engaging with the lobes of the second cam;
a second output member configured to connect with a second half shaft, and
second pins circumferentially arranged and rotationally fixed to the second output member, wherein each of the second pins is disposed in one of the holes of the second cam; and
a coupling member connected between the first and second cams.

20. The cycloidal differential of claim 19, wherein the coupling member includes an eccentric shaft having a first eccentric end coupled to the first cam and a second eccentric end coupled to the second cam.

* * * * *